3,255,781
POLYOXYMETHYLENE PIPE STRUCTURE COATED WITH A LAYER OF POLYETHYLENE
Lawrence Henry Gillespie, Jr., Wilmington, Del., assignor to E. I. du Pont de Nemours and Company, Wilmington, Del., a corporation of Delaware
No Drawing. Filed Nov. 27, 1963, Ser. No. 326,384
1 Claim. (Cl. 138—140)

This invention relates to a novel pipe structure comprising a pipe of polyoxymethylene resin coated with polyethylene.

Pipe of polyoxymethylene resin is known to posssess exceptional resistance to hydrocarbon liquids and gases which fit it uniquely for the construction of pipe distribution systems for gas. However, such pipe has several disadvantages in such service which have detracted from its widespread acceptance in this field. Thus, when the pipe is struck with a sharp instrument while under pressure it tends to explode into jagged fragments rather than merely puncture, thereby presenting a safety hazard to workmen uncovering a buried pipe for the installation of additional services.

It has now been discovered that the undesirable fracture characteristics of polyoxymethylene pipe can be overcome by coating the pipe with a layer of low density polyethylene. Such coating has been found to profoundly modify the rupture characteristics of the polyoxymethylene pipe, and to contain any fragments which might be formed. This in itself is a highly surprising result, however, other unobvious advantages have been found to accrue by the use of such a coating, including a surprisingly higher impact strength and burst strength.

It is accordingly an object of the present invention to provide pipe of polyoxymethylene resin having superior resistance to shattering upon impact.

It is another object of this invention to provide pipe of polyoxymethylene resin with a peelable coating of polyethylene, which has substantially improved physical properties.

These and other objects of this invention which will become apparent hereinafter are achieved by providing a pipe of polyoxymethylene resin having a tightly fitted jacket of a polyethylene resin with a density between 0.905 and 0.945, and a melt index between about 2.5 and 0.1, the jacket having a thickness between 20 and about 100 mils and preferably between about 40 and about 60 mils.

The polyethylene jacket may be placed on the pipe by a simple adaption of well-known wire coating techniques i.e., by extruding the polyethylene through an annular die surrounding a hollow core through which the polyoxymethylene pipe is pushed by conventional tractor takeoff equipment. The extrusion temperature need not be below the melting point of the polyoxymethylene resin.

Polyoxymethylene pipe is known in the art, and is preferably made by the process described in U.S. Patent 3,103,409, issued Sept. 10, 1963, to Bohres, Fields and Jordan. Many other processes for the manufacture of thermoplastic pipe, however, may also be employed.

The term "polyoxymethylene resins" refers to polymers prepared by way of several processes for the polymerization of formaldehyde, trioxane, or polymers of the higher aldehydes. These polymers and processes for their preparation are described in part in United States Patents 2,734,889, issued February 14, 1956, to F. C. Starr, Jr.
2,768,994, issued October 30, 1956, to R. N. MacDonald
2,775,571, issued June 11, 1957, to Schneider
2,828,286, issued March 25, 1958, to R. N. MacDonald
2,841,570, issued July 1, 1958, to R. N. MacDonald
2,844,561, issued July 22, 1958, to M. F. Bechtold et al.
2,848,437, issued August 19, 1958, to W. P. Langsdorf et al.
2,994,687, issued August 1, 1961, to H. H. Goodman et al.
3,000,860, issued September 19, 1961, to N. Brown et al.
3,000,861, issued September 19, 1961, to N. Brown et al.

One variety of polyoxymethylene, i.e., polyoxymethylene dicarboxylates, may be prepared by the processes described and claimed in Patent Nos.

2,998,409, filed August 30, 1957, by S. Dal Nogare et al.
2,964,500, filed September 29, 1958, by S. H. Jenkins et al.

Polyoxymethylene diethers may be prepared by the processes described and claimed in copending patent applications S.N. 682,325, filed September 6, 1957, by N. Brown et al.
S.N. 785,136, filed January 6, 1959, by N. Brown et al.

Included within the term polyoxymethylene for purposes of this application are copolymers containing a predominance of oxymethylene groups, with reactive ends groups such as those prepared by the techniques set forth in United States Patents 2,828,287, issued March 25, 1958, to Theodore L. Cairns et al.
3,027,332, issued March 27, 1962, to K. W. Bartz et al.

and in copending applications

S.N. 35,419, filed June 13, 1960, by N. Brown et al.
S.N. 35,420, filed June 13, 1960, by N. Brown
S.N. 35,421, filed June 13, 1960, by E. T. Cline et al.
S.N. 51,294, filed August 23, 1960, by E. T. Cline et al.
S.N. 91,318, filed February 24, 1961, by E. T. Cline.

The term "polyethylene" refers to polymers of ethylene including copolymers, having a density and melt index within the prescribed range. Such polymers of ethylene are well known in the art. They may be made for example by the homopolymerization of ethylene at pressures in the range between about 15,000 p.s.i. and 35,000 p.s.i. using a free radical catalyst and temperature of about 150 to 300° C., as described for example by Fawcett et al. in U.S. Patent 2,153,553. Copolymers of ethylene with higher 1-olefins made by coordination or Ziegler catalysts i.e., a compound of a transition metal selected from Groups IV to VII of the Periodic Table, preferably titanium, partially reduced with an aluminium alkyl, Grignard reagent, alkali metal hydride or borohydride, or the like, may also be employed.

Blends of polyethylene with polyisobutylene are also effective coating materials and are embraced within the scope of this discovery.

The melt index may be determined by ASTM test procedure D1238–57T, and should be below about 2.5 in order to avoid stress cracking of the jacket. Polymers of ethylene having a melt index of less than 0.1 are difficult to extrude and accordingly are not preferred.

Density should be determined for the polymer after conditioning by fabricating a sample e.g., by compression molding and slow cooling from the melt at a rate not exceeding 1° C. per minute to a temperature below about 60° C. The density may then be determined by ASTM test procedures D792–50.

The term pipe refers to a substantially rigid tubular structure adapted to convey fluids under pressure. Generally the wall thickness of thermoplastic pipe is between about 40 and 200 mils. Pipe is thus distinctive from tubular film which generally is not rigid and has a wall thickness of less than about 10 mils.

This invention is further illustrated by the following specific examples which are not however intended to fully delineate the scope of this discovery.

Examples

Lengths of pipe having a nominal diameter of 1½" and a wall thickness of 0.080 inch were fabricated by the techniques described in U.S. Patent 3,103,409 from a polyoxymethylene resin sold under the trade name of "Delrin" 150 acetal resin having a melting point of 347° F., and consisting essentially of a thermally stable polymer of formaldehyde. This pipe was passed through the hollow core of an annular die and a coating of a free-radical low density polymer of ethylene, density 0.922, melt index 1.5 was extruded at a thickness (measured after cooling) of 75 mils.

Sections of pipe were pressurized to 60 p.s.i. (the maximum pressure advocated for gas distribution service) then punctured by dropping a ¼" screwdriver bit loaded with a 10 lb. weight onto the pipe from a height of 2½ ft. The uncoated pipe exploded into jagged fragments when punctured. The coated pipe was simply pierced without fragmentation of the polyoxymethylene resin.

The impact strength of the pipe was measured by two tests (1) a test designed to crush the pipe such as might be encountered in field use by a wheeled vehicle passing thereover and (2) by a smaller diameter head designed to penetrate rather than crush the pipe.

In the first test procedure the pipe was supported on an anvil consisting of a steel block machined to a shallow V having an angle of 120°. The impacting device consisted of a cylindrical steel head having a diameter of 2", loaded to a total weight of 12 lbs. and slideably supported on vertical rails above the anvil.

The crushing impact strength of the uncoated pipe, using this equipment was found to be 30 ft. lbs. for the average height to break 50 percent of the samples and to be substantially independent of the length of the samples (i.e., the impact characteristics of 20 ft. pipe could be adequately determined from a 12 inch sample). The typical fracture, was a shattering of the pipe into jagged fragments, and occasionally a splitting substantially along the axis of the pipe. By contrast the impact strength of the coated pipe (defined as the mean force in ft. lbs. for 50% breakage of the inner polyoxymethylene liner) was found to be 49.4 ft. lbs. The rupture was entirely different from the rupture encountered with non-coated pipe, generally consisting of a splitting for a sheet distance along the wall of the pipe without rupture of the polyethylene jacket.

In the second impact test, the same anvil was employed as in the test described hereinabove. The hammer consisted of a rod ½" in diameter and finished at the impacting surface to a hemisphere. The rod was guided to the center of the pipe and loaded to ten pounds.

The uncoated pipe shattered when broken by this test. By contrast the inner liner of the coated pipe was punctured by removal of a generally disc shaped fragment, again generally without fracture of the inner liner.

The short term burst strength was determined by ASTM test method D1599–62T using samples of the pipe 10 times diameter in length. For 1½" pipe this was 18" in length. For the uncoated pipe a burst strength of 900 p.s.i. was found, the coated pipe the burst pressure was 1200 p.s.i. (average). Again the coated pipe showed greatly improved shattering characteristics.

Similar coated pipe was made using a polyethylene of density 0.960. The bursting pressure of this pipe was found to be about 1250 p.s.i. which was not considered a significant improvement over the coating of low density polyethylene, a result which was surprising in view of the increased tensile strength of the higher density polyethylene.

In the cases of the high and the low density pipe the non-adhesion of the polyoxymethylene resin pipe to the polyethylene preheating was demonstrated by cutting the jacketing of a sheet section of pipe with a sheet knife along the axial direction. The jacket could then be readily removed.

The coated pipe of this invention offers substantial advantages over uncoated pipe in addition to those described hereinabove. The non-adhesion of the coating to the polyoxymethylene resin is of substantial advantage in the detection of small leaks and the like in the construction of pipe lines. Under substantial pressure the polyethylene coat will balloon and rupture at the leak more readily by virtue of the non-adhesion while small leaks permit escape of gas between the coat and the polyoxymethylene pipe which may be detected at the ends of the pipe section by painting with soapy water. Furthermore, the lining is readily peeled away from short sections of the pipe to enable the use of heat-sealing techniques applicable to polyoxymethylene resins for the attachment of couplings and other pipe fittings.

Yet another substantial advantage of the use of polyethylene jacketing is that carbon black and like stabilizing agents to degradation may be incorporated in the jacketing rather than in the polyoxymethylene resin which is generally more difficult to compound with pigments and the like than polyethylene resins.

Still another advantage of the polyethylene coating is that it imparts substantial abrasion resistance to the composite pipe, minimizing minor surface damage in handling and transportation in addition to improving the impact properties of the pipe which thus enhances resistance to major damage.

Many modifications and advantages of this discovery will be apparent to those skilled in the art.

I claim:

A pipe structure comprising an inner pipe consisting essentially of polyoxymethylene resin having a tightly fitting jacket comprising a layer of from 20 to 100 mils of a polymer of ethylene characterized by a density in the range between 0.905 and 0.945 and a melt index between 2.5 and 1.

References Cited by the Examiner

UNITED STATES PATENTS

| | | | |
|---|---|---|---|
| 2,932,323 | 4/1960 | Aries | 138—137 |
| 2,937,665 | 5/1960 | Kennedy | 138—145 |
| 3,000,772 | 9/1961 | Lunn | 161—93 |
| 3,024,813 | 3/1962 | Sear | 138—137 |
| 3,026,223 | 3/1962 | Vanderbilt | 138—141 |
| 3,103,409 | 9/1963 | Bohres et al. | 264—209 |

LAVERNE D. GEIGER, *Primary Examiner.*

H. ARTIS, *Assistant Examiner.*